T. B. FORD.
HIGH PRESSURE HOSE.
APPLICATION FILED MAY 23, 1908.
916,136.
Patented Mar. 23, 1909.
2 SHEETS—SHEET 1.
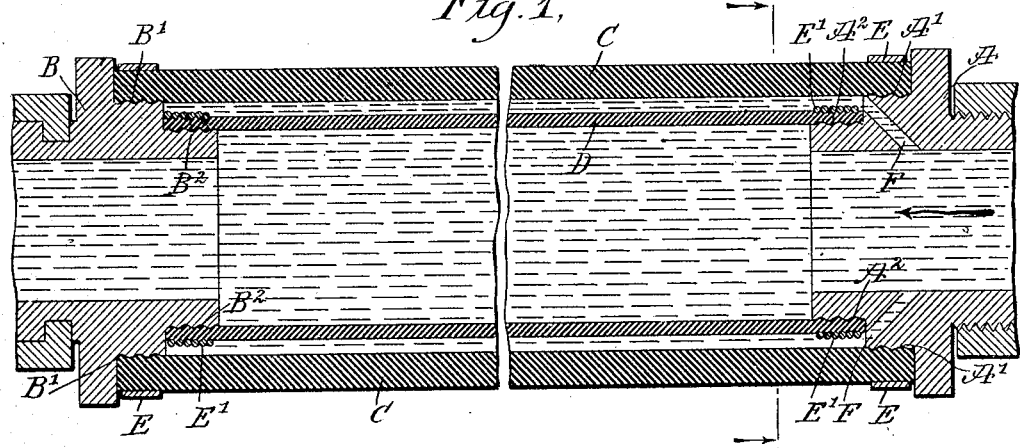
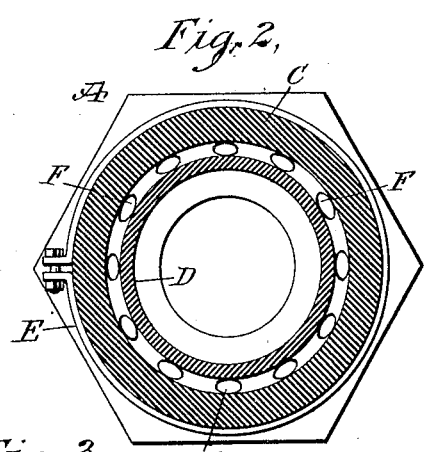
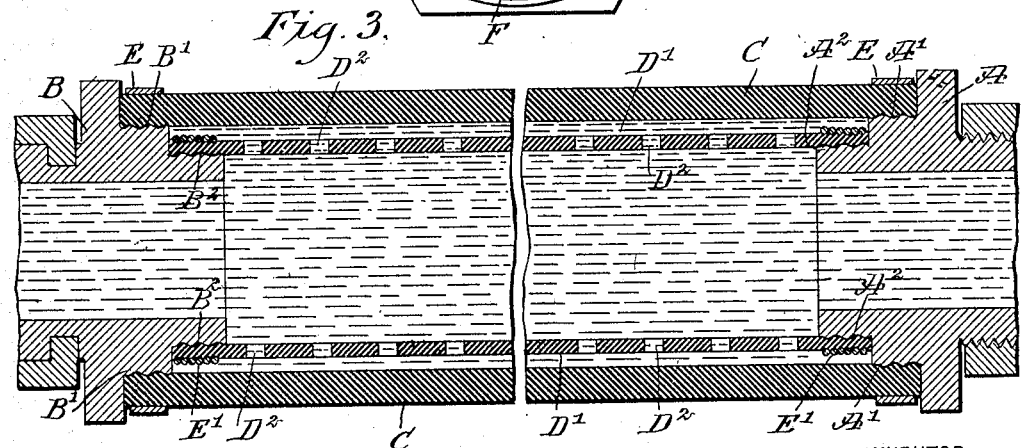
WITNESSES
Edward Thorpe
Rev. G. Hosk
INVENTOR
Thomas B. Ford
BY Munn & Co.
ATTORNEYS

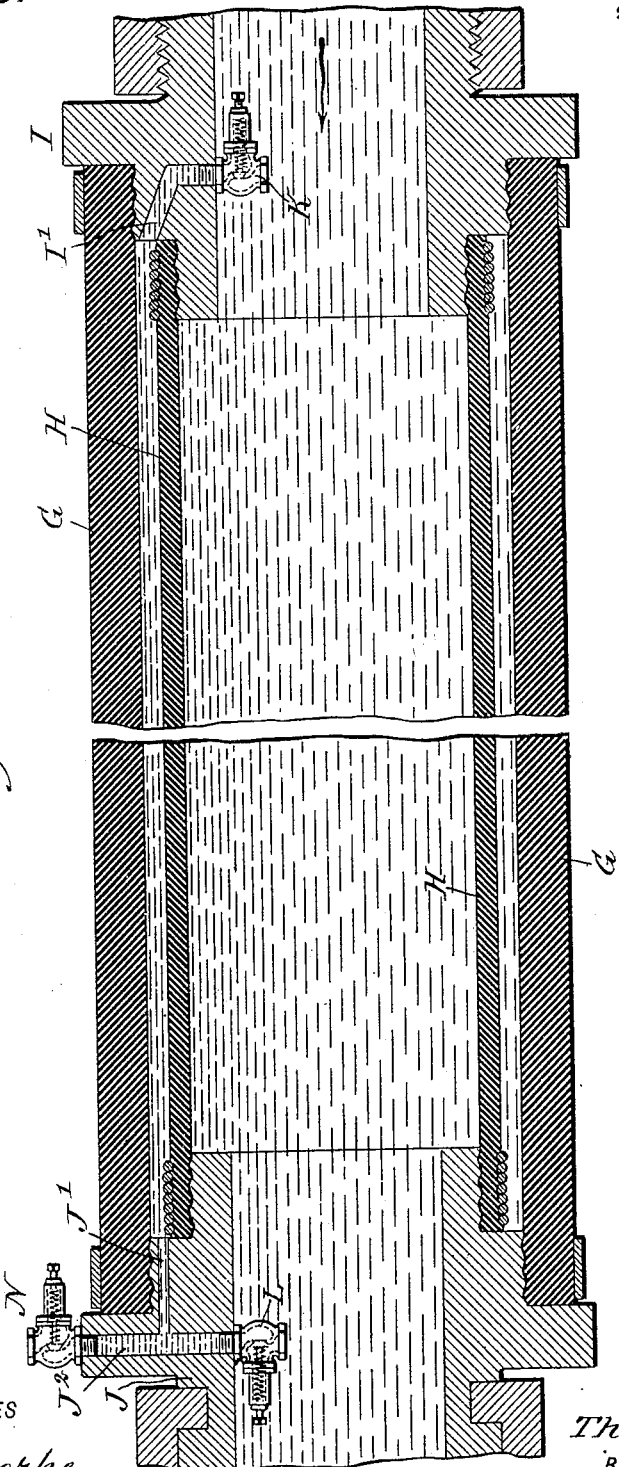

UNITED STATES PATENT OFFICE.

THOMAS BURTON FORD, OF NEW YORK, N. Y.

HIGH-PRESSURE HOSE.

No. 916,136.  Specification of Letters Patent.  Patented March 23, 1909.

Application filed May 23, 1908. Serial No. 434,521.

*To all whom it may concern:*

Be it known that I, THOMAS B. FORD, a citizen of the United States, and a resident of the city of New York, borough of Brooklyn, in the county of Kings and State of New York, have invented a new and Improved High-Pressure Hose, of which the following is a full, clear, and exact description.

The object of the invention is to provide a new and improved high pressure hose, more especially designed for use with fire-fighting apparatus, and provided with an outer or a main hose, and an inner hose spaced from the outer hose, to allow the water flowing through the inner hose to fill the space between the said outer hose and the inner hose, whereby the outer hose is subjected only to pressure and not to the friction of the moving water, thus reducing the wear and tear, incident to the flow of the water, to a minimum, and rendering the hose capable of withstanding very high pressure, at the same time allowing convenient and economical replacing or repairing of the inner hose.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a longitudinal central section of the improvement; Fig. 2 is a transverse section of the same, on the line 2—2 of Fig. 1; Fig. 3 is a longitudinal central section of a modified form of the improvement; and Fig. 4 is a similar view of another modified form of the improvement.

The couplings A and B for any section or length of hose are provided with concentric seats A', A² and B', B², respectively, for receiving the ends of an outer or main hose C and an inner hose D, the said outer hose C and the inner hose D being spaced apart to form a water space for containing dormant water. The ends of the outer hose C and the inner hose D are secured in position on their seats A', B' and A², B², respectively, by suitable fastening devices E and E', such as bands, wires and the like, to securely connect the parts with each other and to hold the outer hose C spaced from the inner hose D. As shown in Figs. 1 and 2, the water flowing through the couplings A and B and through the inner hose D can fill the space between the outer hose C and the inner hose D by providing the coupling A with ports F, connecting the bore of the coupling A with the water space between the outer hose C and the inner hose D. Thus when the hose is in use and water flows through the couplings A and B and the inner hose D, a portion of the water fills the water space between the outer hose C and the inner hose D, and as this water is dormant it is evident that it relieves the outer hose C of all friction of moving water while the inner hose D is subjected to the same pressure on both sides, and hence the pressures are equalized and the inner hose D may be made exceedingly thin without danger of breaking. The outer hose C is made comparatively strong but as it is not subjected to the wear and tear incident to the water flowing through the hose, it is evident that the hose can withstand high pressure and last a long time. The inner hose D which is subjected to the wear incident to the flowing water can be readily and economically replaced in case it is worn out or broken.

Various means may be employed for filling the water space, between the outer hose C and the inner hose D, with water; for instance, as shown in Fig. 3, the ports F are dispensed with and the inner hose D' is provided with apertures D² through which water can flow from the inner hose to the dormant-water space, to fill the same.

In the modified form shown in Fig. 4, the outer hose G and the inner hose H are secured to the couplings I and J in the same manner as above described in reference to Fig. 1, and the coupling I is provided with a port I' connected at one end with a reducing pressure valve K located in the bore of the coupling I, the other end of the port I' leading to the dead water space between the hose G and the hose H. The coupling J is provided with a port J' leading from the dead water space to a port J² connected at its inner end with a drain or relief valve L and at its outer end with a leakage or pressure relief valve N. The valve K is set to a pressure somewhat less than the pressure of the water flowing through the couplings I and J and the inner hose H, so that the water flows through the valve K and port I' into the dead water space, to fill the same at a reduced pressure, and the valve N is set to a somewhat higher pressure than that in the dead water space, so that in case of an excess of pressure in the dead water space, the valve N opens to relieve the outer hose G of the excess pressure. The valve L is set to a pressure somewhat more than the difference in pressure between that of the water flowing through the hose H and the dormant water in the dead water space, to relieve the dead water space of pressure in case a sudden reduction of pressure in the water flowing through the hose H takes place. As an example, it may be stated that if the pressure of the water flowing through the hose H is say 300 pounds to the square inch, then the valve K is set to 250 pounds, the valve N to 260 pounds and the valve L to 60 pounds. I do not limit myself to the example given as the valves are set according to the use to be made of the hose in a particular locality. In short, it may be said that the function of the three valves shown in the modified form illustrated in Fig. 4, is to provide only a partial equalization of pressure between the inner and outer hose lengths, in case a total equalization is not required or desirable.

Having thus described my invention, I claim as new and desire to secure by Letters Patent:

1. A high pressure water hose, comprising an outer main hose, and an inner hose spaced from the outer hose to form a water space between the outer and inner hose, the said water space being adapted to fill with water flowing through the inner hose.

2. A high pressure water hose, comprising couplings, an outer hose, an inner hose, the ends of the said hose being secured to the said couplings and the said inner and outer hose being spaced apart to form an annular water space, and means for conducting water into the said water space to fill the same with dormant water when the hose is in use and the water flows through the couplings and the said inner hose.

3. A high pressure water hose, comprising couplings, an outer hose, and an inner hose, the ends of the said hose being secured to the said couplings and the said inner and outer hose being spaced apart to form an annular water space, the interior of one of the said couplings being connected with the said water space, to fill the same with dormant water when the hose is in use and the water flows through the said couplings and the said inner hose.

4. A high pressure water hose, comprising an outer main hose, and an inner hose spaced from the outer hose to form a water space between the outer and inner hose, the said water space being adapted to fill with water flowing through the inner hose, and means for reducing the pressure of the water flowing into the said water space.

5. A high pressure water hose, comprising an outer main hose, and an inner hose spaced from the outer hose to form a water space between the water and inner hose, the said water space being adapted to fill with water flowing through the inner hose, and means for relieving the said water space of excess pressure.

6. A high pressure water hose, comprising an outer main hose, and an inner hose spaced from the outer hose to form a water space between the outer and inner hose, the said water space being adapted to fill with water flowing through the inner hose, and means for reducing the pressure of the water in the dead water space on a reduction of pressure of the water in the inner hose.

In testimony whereof I have signed my name to this specification in the presence of two subscribing witnesses.

THOS. BURTON FORD.

Witnesses
HOUGHTON WHEELER,
W. W. MANNING.